United States Patent
Chen et al.

(10) Patent No.: US 11,265,735 B2
(45) Date of Patent: Mar. 1, 2022

(54) TRANSMISSION CONFIGURATION METHOD, TRANSMISSION CONFIGURATION DETERMINATION METHOD, BASE STATION AND TERMINAL

(71) Applicant: XI'AN ZHONGXING NEW SOFTWARE CO., LTD., Xi'An (CN)

(72) Inventors: Yijian Chen, Shenzhen (CN); Zhaohua Lu, Shenzhen (CN); Yu Ngok Li, Shenzhen (CN); Bo Gao, Shenzhen (CN)

(73) Assignee: XI'AN ZHONGXING NEW SOFTWARE CO., LTD, Xi'an Shaanxi (CN)

( * ) Notice: Subject to any disclaimer, the term of this patent is extended or adjusted under 35 U.S.C. 154(b) by 0 days.

(21) Appl. No.: 16/347,392

(22) PCT Filed: Nov. 2, 2017

(86) PCT No.: PCT/CN2017/109123
§ 371 (c)(1),
(2) Date: May 3, 2019

(87) PCT Pub. No.: WO2018/082613
PCT Pub. Date: May 11, 2018

(65) Prior Publication Data
US 2019/0289476 A1    Sep. 19, 2019

(30) Foreign Application Priority Data
Nov. 3, 2016    (CN) .......................... 201610974234.5

(51) Int. Cl.
H04W 24/02    (2009.01)
H04L 5/00    (2006.01)
(Continued)

(52) U.S. Cl.
CPC .......... *H04W 24/02* (2013.01); *H04B 7/0413* (2013.01); *H04L 5/0048* (2013.01); *H04L 41/0806* (2013.01)

(58) Field of Classification Search
CPC combination set(s) only.
See application file for complete search history.

(56) References Cited

U.S. PATENT DOCUMENTS

2012/0281556 A1    11/2012    Sayana et al.
2012/0309405 A1*    12/2012    Parkvall .................. H04W 4/08
                                                                    455/452.1
(Continued)

FOREIGN PATENT DOCUMENTS

CN    101815248 A    8/2010
CN    102291737 A    12/2011
WO    2016/086144 A1    6/2016

OTHER PUBLICATIONS

International Search Report dated Dec. 15, 2017 for International Application No. PCT/CN2017/109123, 5 pages.
(Continued)

*Primary Examiner* — Mansour Oveissi
(74) *Attorney, Agent, or Firm* — Knobbe, Martens, Olson & Bear, LLP

(57) ABSTRACT

A transmission configuration method includes: determining a candidate transmission configuration information set, where the determined candidate transmission configuration information set includes K types of transmission configuration information, and each of the K types of transmission configuration information is used for implementing transmission configuration of at least one of a signal or a channel, where K is greater than or equal to 1; selecting at least one type of transmission configuration information from the determined candidate transmission configuration informa-
(Continued)

tion set; and transmitting the selected transmission configuration information to a terminal by using a signaling.

17 Claims, 5 Drawing Sheets

(51) Int. Cl.
*H04L 41/0806* (2022.01)
*H04B 7/0413* (2017.01)

(56) References Cited

U.S. PATENT DOCUMENTS

| | | |
|---|---|---|
| 2013/0286960 A1 | 10/2013 | Li et al. |
| 2014/0307827 A1* | 10/2014 | Liu .................. H04L 1/0033 375/295 |
| 2016/0269160 A1 | 9/2016 | Noh et al. |
| 2017/0332362 A1* | 11/2017 | Li .................. H04W 72/12 |
| 2019/0104549 A1 | 4/2019 | Deng et al. |
| 2019/0222411 A1* | 7/2019 | Xie .................. H04W 56/0035 |
| 2020/0053800 A1 | 2/2020 | Deng et al. |

OTHER PUBLICATIONS

Written Opinion of the International Searching Authority dated Dec. 15, 2017 for International Application No. PCT/CN2017/109123, 4 pages.
Extended European Search Report of corresponding European Patent Application No. 17867449.5—9 pages (dated Apr. 6, 2020).

* cited by examiner

TRANSMISSION CONFIGURATION METHOD, TRANSMISSION CONFIGURATION DETERMINATION METHOD, BASE STATION AND TERMINAL

I. CROSS-REFERENCE TO RELATED APPLICATIONS

This is a National Phase Application, filed under 35 U.S.C. 371, of International Patent Application No. PCT/CN2017/109123, filed on Nov. 2, 2017, which claims priority to Chinese patent application No. 201610974234.5 filed on Nov. 3, 2016, contents of each of which are incorporated herein by reference in their entireties.

TECHNICAL FIELD

The present application relates to, but is not limited to, the field of wireless communication technologies and, in particular, to a transmission configuration method, a transmission configuration determination method, a base station, a terminal and a computer storage medium.

BACKGROUND

In a wireless communication system, a base station and a terminal may use multiple antennas for transmission to obtain higher sending rate and receiving rate. One principle of the multi-antenna technology is to utilize some of channel characteristics to perform beamforming to achieve sending and receiving that match the channel characteristics. The signal has high radiation direction. This can improve the system performance effectively and improve the communication performance significantly without increasing bandwidth and power consumption. Therefore, the multi-antenna technology is a promising technology widely used in current communication systems. FIG. 1 is a schematic diagram of the beamforming technology.

As shown in FIG. 1, at the base station, signals processed by $n_{RF}^t$ radio frequency (RF) paths are sent to a transmitting antenna array. This transmitting antenna array is composed of $N_{t,\theta} \times N_{t,\varphi}$ array elements. A directional beam is generated by the array elements of the transmitting antenna array through the beamforming technology. After reflected by a reflecting surface, the directional beam is received by the terminal. The receiving antenna array of the terminal is composed of $N_{r,\theta} \times N_{r,\varphi}$ array elements. The signals, which are received by the receiving antenna array, pass through splitters and phase shifters, and are sent to $n_{RF}^r$ RF paths for further processing.

Beamforming is achieved by precoding. A beam may be formed in a feature space or a physical space by precoding. The precoding may include two parts: baseband precoding corresponding to a base beam and RF precoding corresponding to an RF beam. The baseband processing primarily acts on a baseband path. The RF processing primarily acts on the oscillator of an RF path. The baseband processing is done on a baseband and the RF processing is done on a radio frequency. The beam here may be a baseband beam, an RF beam or a combination thereof.

In the case where a large-scale antenna is deployed on the base station, in view of high channel dimensions and coexistence of RF precoding and baseband precoding, measurement feedback and transmission in a Multiple-Input Multiple-Output (MIMO) system may be implemented by means of beam information measurement feedback. The beam information measurement feedback, that is, a beam training process, includes the steps described below.

In step 1, the base station sends beam pilots in different directions; and notifies the terminal of configuration information.

In step 2, the terminal measures the reception quality of the beam pilots and feeds back pilots of high reception quality to the base station.

In step 3, the base station transmits data by using the precoding corresponding to the received pilots of high reception quality.

Here the base station continues to send beams with a narrower bandwidth within the coverage of the selected beams, and the terminal performs selection from the received beams. This refines beams. The base station obtains more accurate beam direction information through feedback from the terminal. These beam training steps may be performed multiple times.

Alternatively, the base station may send more pilot signals on the basis of the beams reported by the terminal. These pilot signals are used for measuring interference between beams or optimal weighting and combination parameters between beams. The weighting processes are typically performed on the baseband to obtain a larger combination gain. In fact, they may also be regarded as more accurate beams (beams in the feature space).

After acquiring the information on beam selection, the base station may use the selected beams to perform downlink transmission. If Channel State Information (CSI) may be further obtained, the transmission performance can be improved more effectively.

For an uplink transmission process, if reciprocity exists, when the terminal selects the best transmit beam, if a same beam is transmitted multiple times, the terminal tries to receive by using multiple different beams. FIG. 2 is a schematic diagram illustrating reception of beams on a terminal. As shown in FIG. 2, the terminal may scan M transmit beams (that is, a transmit beam 1, a transmit beam 2, . . . , a transmit beam M) by using a beam scan block 1, a beam scan block 2, . . . , a beam scan block M. M is an integer greater than one. Beam scan block 1 through beam scan block M correspond to receive beam 1 to receive beam M respectively. That is to say, for M transmit beams, the terminal selects a receive beam that the terminal considers to be best.

For each different transmit beam, the best receive beam may be different. This can be understood as that the different angles of emergence of the multiple paths in a channel correspond to different angles of arrival. Here the receive beam may be reciprocated as an uplink transmit beam.

The beam transmission is further described below. FIG. 3 is a schematic diagram of beam transmission. As shown in FIG. 3, in the Time Division Duplexing (TDD) system in which reciprocity exists, after the above-mentioned beam training is completed, the base station may indicate which beam the base station will use for transmission, for example, the beam dl_txbeam Ni for transmission. Thus, for downlink transmission, the terminal can understand the transmission behavior of the base station. Therefore, the optimal downlink receive beam dl_rxbeam Mk corresponding to the downlink transmit beam dl_txbeam Ni may be used for reception.

For uplink transmission, when the downlink uses the transmit beam dl_txbeam Ni for transmission, the terminal considers its own optimal receive beam to be dl_rx beam Mk. The uplink transmit beam ul_tx beam Mk can be obtained by way of reciprocating the receive beam dl_rx beam Mk to the uplink. Then the base station receives by using the uplink receive beam ul_tx beam Ni that is reciprocal with the transmit beam dl_txbeam Ni.

Therefore, for the above-mentioned communication system with reciprocity, once the base station notifies the terminal of the optimal downlink transmit beam, what beam the terminal uses to perform downlink reception and what beam the terminal uses to perform uplink transmission are determined. The terminal may transmit a Physical Downlink Control Channel (PDCCH), a Physical Downlink Shared Channel (PDSCH), a downlink channel measurement reference signal (SI-RS), a Physical Uplink Control Channel (PUCCH), a Physical Uplink Shared Channel (PUSCH) and an uplink Sounding Reference Signal (SRS) by using a determined beam or by using a narrower beam within a determined beam range.

Two methods are provided for indicating the downlink transmit beam to the terminal and are described below.

Method 1: A beam index is indicated by a signaling at the Media Access Control (MAC) layer. The base station indicates, by using the signaling at the MAC layer, allocation of one beam to the terminal. However, switching is generally slow when beam indication is performed by the signaling at the MAC layer.

Method 2: The physical layer of the base station triggers one beam information feedback, and indicates the receive and transmit beams to the terminal on the basis of the feedback information. For example, the terminal may measure X beams and report the X beams to the base station on the basis of the beam pilots. After receiving measurement information, the base station uses the best transmit beam by default and the best transmit beam works after a delay of t time units. X is greater than or equal to 1, and t is greater than 0.

When the transmit and receive beams are configured, there may be a case where the transmit beams and the receive beams are flexibly configured according to actual application scenarios and application requirements. The following exemplarily describes several cases.

Case 1: The uplink transmission and the downlink transmission are always bound to one pair of beams through reciprocity. Therefore, the uplink transmission and the downlink transmission always have a strong binding relationship, and it is impossible to perform downlink transmission and uplink transmission using antennas in separate positions. For example, the case where the antenna spacing is large, and transmitting antenna element 1 is used to transmit in the downlink and the antenna element 2 is used to receive in the uplink often appears in a heterogeneous network. For example, a macro base station serves in the downlink and a micro base station receives in the uplink. This saves uplink terminal transmission power and achieves flexibly load balancing.

Case 2: The control channel (or signal) and the data channel (or signal) are always bound to the same beam, and the following beam selection scheme cannot be implemented: the beam of the control channel (or signal) is selected on the basis of the beam obtained from one type of pilot measurement feedback while the beam of the data channel (or signal) is selected on the basis of the beam obtained from another type of pilot measurement feedback.

Case 3: A beam can be indicated by downlink-pilot-based measurement and the beam selection result and cannot be indicated by uplink-pilot-based measurement and the beam selection result. In this way, the definition of the beam is single and not flexible and thus not applicable to various application scenarios.

Case 4: The beam of a pilot signal is bound to a data/control channel or signal, and pilot signals outside the beam range indicated by the measurement cannot be used.

Therefore, the flexibility in configuration of a transmit beam and a receive beam is greatly limited, thereby resulting in a decrease in the transmission performance of the communication system. It is to be noted that here the beam indication information may explicitly indicate information about one beam index, may indicate that the transmission manner is bound to the transmission/reception manner of a resource (for example, a time-frequency-code resource), or may indicate a spatial correlation similar to the spatial correlation of a signal and/or channel on a resource (for example, a time-frequency-code resource). The spatial correlation may be the spatial correlation of a transmit angle or an arrival angle.

SUMMARY

The following is the summary of the subject matter described herein in detail. This summary is not intended to limit the scope of the claims.

Embodiments of the present disclosure provide a transmission configuration method, a transmission configuration determination method, a base station, a terminal and a computer storage medium, which can implement flexible configuration of transmission information.

Embodiments of the present disclosure provide a transmission configuration method. The method includes:

determining a candidate transmission configuration information set, where the determined candidate transmission configuration information set includes K types of transmission configuration information, and each of the K types of transmission configuration information is used for implementing transmission configuration of at least one of a signal or a channel, where K is greater than or equal to 1;

selecting at least one type of transmission configuration information from the determined candidate transmission configuration information set; and transmitting the selected transmission configuration information to a terminal by using a signaling.

Embodiments of the present disclosure further provide a transmission configuration determination method. The method includes:

determining a candidate transmission configuration information set, where the determined candidate transmission configuration information set includes K types of transmission configuration information, and each of the K types of transmission configuration information is used for implementing transmission configuration of at least one of a signal or a channel, where K is greater than or equal to 1;

receiving selection indication information from a base station, where the selection indication information is used for indicating selection of at least one type of transmission configuration information from the determined candidate transmission configuration information set; and selecting the at least one type of transmission configuration information from the determined candidate transmission configuration information set according to the selection indication information.

Embodiments of the present disclosure further provide a base station. The base station includes: a first processor and a first signal transceiver.

The first processor is configured to determine a candidate transmission configuration information set, where the determined candidate transmission configuration information set includes K types of transmission configuration information, and each of the K types of transmission configuration information is used for implementing transmission configuration of at least one of a signal or a channel, where K is greater than or equal to 1.

The first processor is further configured to select at least one type of transmission configuration information from the determined candidate transmission configuration information set and to send the selected transmission configuration information to the first signal transceiver.

The first signal transceiver is configured to transmit the selected transmission configuration information to a terminal by using a signaling.

Embodiments of the present disclosure further provide a terminal. The terminal includes: a second processor and a second signal transceiver.

The second processor is configured to determine a candidate transmission configuration information set, where the determined candidate transmission configuration information set includes K types of transmission configuration information, and each of the K types of transmission configuration information is used for implementing transmission configuration of at least one of a signal or a channel, where K is greater than or equal to 1.

The second signal transceiver is configured to receive selection indication information from a base station and to send the selection indication information to the second processor, where the selection indication information is used for indicating selection of at least one type of transmission configuration information from the determined candidate transmission configuration information set.

The second processor is further configured to select the at least one type of transmission configuration information from the determined candidate transmission configuration information set according to the selection indication information.

Embodiments of the present disclosure further provide a computer storage medium. The computer storage medium is configured to store program instructions. The instructions include: determining a candidate transmission configuration information set, where the determined candidate transmission configuration information set includes K types of transmission configuration information, and each of the K types of transmission configuration information is used for implementing transmission configuration of at least one of a signal or a channel, where K is greater than or equal to 1;

selecting at least one type of transmission configuration information from the determined candidate transmission configuration information set; and transmitting the selected transmission configuration information to a terminal by using a signaling.

Embodiments of the present disclosure further provide another computer storage medium. The computer storage medium is configured to store program instructions. The instructions include:

determining a candidate transmission configuration information set, where the determined candidate transmission configuration information set includes K types of transmission configuration information, and each of the K types of transmission configuration information is used for implementing transmission configuration of at least one of a signal or a channel, where K is greater than or equal to 1;

receiving selection indication information from a base station, where the selection indication information is used for indicating selection of at least one type of transmission configuration information from the determined candidate transmission configuration information set; and selecting the at least one type of transmission configuration information from the determined candidate transmission configuration information set according to the selection indication information.

In the transmission configuration method, transmission configuration determination method, base station, terminal and computer storage medium provided in embodiments of the present disclosure, a candidate transmission configuration information set is determined, where the determined candidate transmission configuration information set includes K types of transmission configuration information, and each of the K types of transmission configuration information is used for implementing transmission configuration of at least one of a signal or a channel, where K is greater than or equal to 1; at least one type of transmission configuration information is selected from the determined candidate transmission configuration information set; and the selected transmission configuration information is transmitted to the terminal by using a signaling. In this way, the transmission configuration information can be configured flexibly, thereby better meeting the transmission requirements and improving the transmission performance of the communication system.

Other aspects can be understood after the accompanying drawings and detailed description are read and understood.

DETAILED DESCRIPTION

Embodiments of the present disclosure will be described in detail with reference to the accompanying drawings.

First Embodiment

Figure 1:
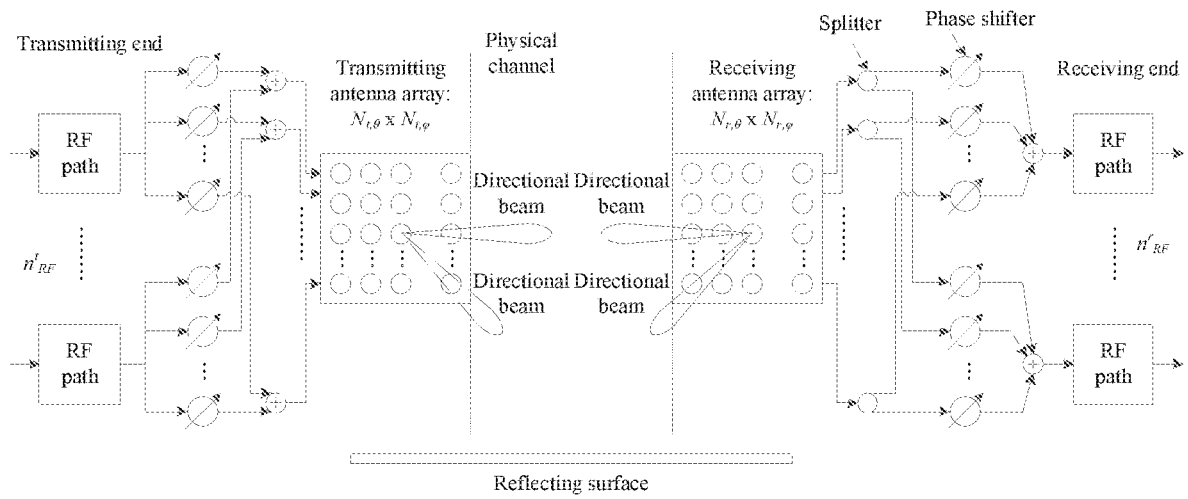
FIG. 1 is a schematic diagram of the beamforming technology.
Figure 2:
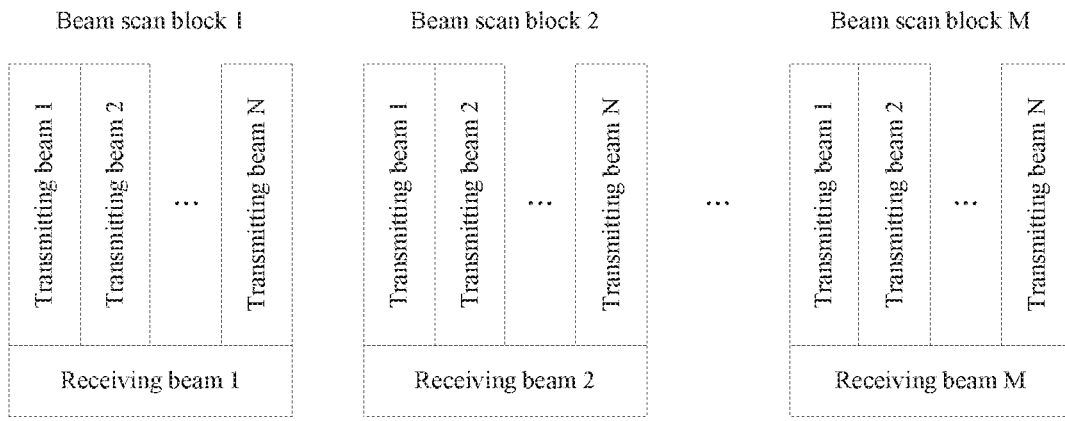
FIG. 2 is a schematic diagram illustrating reception of beams on a terminal.
Figure 3:
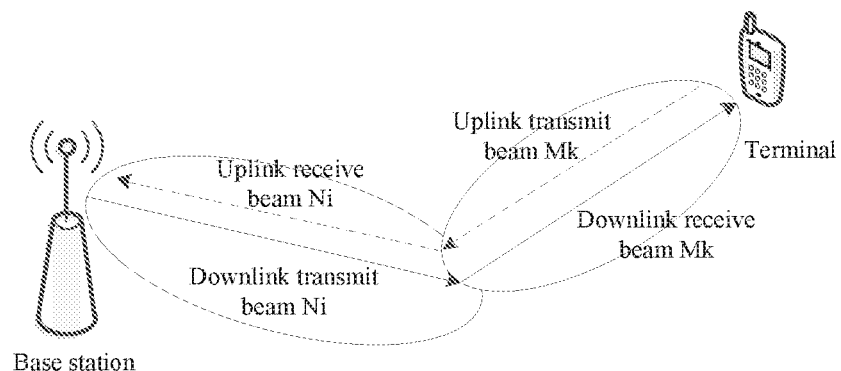
FIG. 3 is a schematic diagram of beam transmission.
Figure 4:
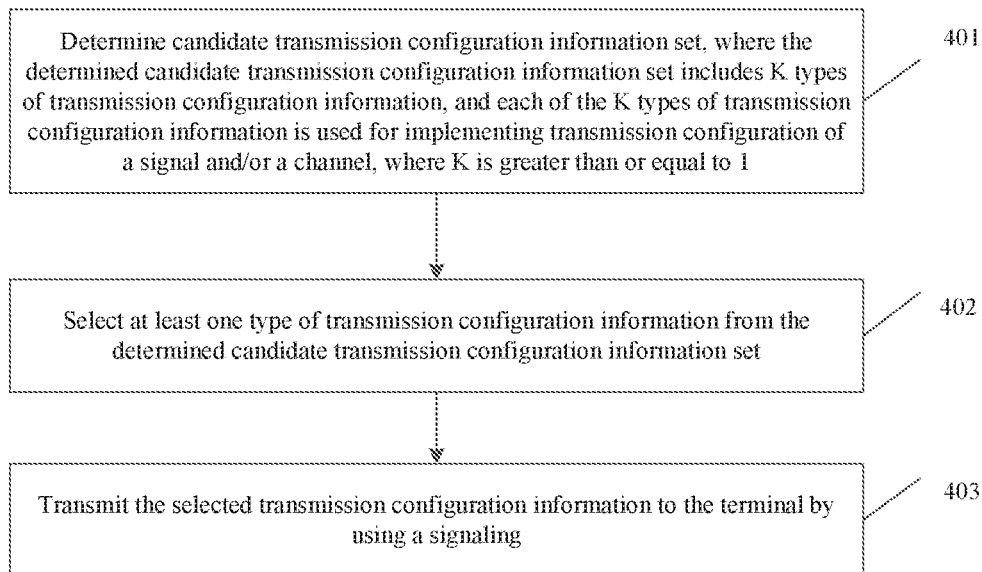
FIG. 4 is a flowchart of one embodiment of a transmission configuration method according to embodiments of the present disclosure.

A first embodiment of the present disclosure provides a transmission configuration method. The method is applicable to network-side equipment such as a base station. FIG. 4 is a flowchart of one embodiment of a transmission configuration method according to embodiments of the present disclosure. As shown in FIG. 4, the method includes the steps described below.

In step 401, a candidate transmission configuration information set is determined, where the determined candidate transmission configuration information set includes K types of transmission configuration information, and each of the K types of transmission configuration information is used for implementing transmission configuration of a signal and/or a channel, where K is greater than or equal to 1.

In an implementation, each piece of transmission configuration information in the determined candidate transmission configuration information set may be used for configuration of an uplink channel and/or a downlink channel, and/or may be used for configuration of an uplink signal and/or a downlink signal. Here the types of the uplink channel, the uplink signal, the downlink channel and the downlink channel are not limited.

In an implementation, the determined candidate transmission configuration information set includes transmission configuration information corresponding to at least two types of signals. That is, the determined candidate transmission configuration information set includes transmission configuration information in transmission association with at least two types of signals. In embodiments of the present disclosure, if a type of signal or a type of channel is in transmission association with a piece of transmission configuration information, then the transmission of this type of signal or this type of channel is configured using the transmission configuration information in transmission association with this type of signal or this type of channel. For example, if a type of signal or a type of channel has been received or sent, then "transmission association" means "the same as or similar to" a transmission strategy for receiving or sending this type of signal or this type of channel, including a sending strategy and/or a receiving strategy. In this way, the transmission configuration information can be used for the transmission of the current channel or signal. The classification criteria for signals are not limited.

To achieve a higher flexibility in transmission configuration, in one embodiment, pieces of transmission configuration information in the candidate transmission configuration information set may correspond to the same type/set of pilot signals or may correspond to different types/sets of pilot signals.

For example, the candidate transmission configuration information set is a transmission configuration information set described in Table 1.

TABLE 1

| Candidate transmission configuration information set |
| --- |
| Transmission configuration information 1 Pilot type A, first set of pilots |
| Transmission configuration information 2 Pilot type B, first set of pilots |
| Transmission configuration information 3 Pilot type B, second set of pilots |
| Transmission configuration information 4 Pilot type C, second set of pilots |

That is to say, the candidate transmission configuration information set may be in transmission association with different types of pilot signals or may be bound to different sets of pilot signals of the same type of pilot. Here the different sets of pilot signals correspond to their respective transmission configuration information.

For example, one candidate transmission configuration information set is in transmission association with two Channel State Information-Reference Signal (CSI-RS) sets having different configurations, or in transmission association with one CSI-RS set and one Sounding Reference Signal (SRS) set, or in transmission association with one synchronization signal set and one CSI-RS or SRS set, or in transmission association with one Beam Reference Signal (BRS) set and one CSI-RS set, or in transmission association with one BRS set and one SRS set, or in transmission association with one BRS set and one Demodulation Reference Signal (DMRS) set. Here the synchronization signals may be downlink synchronization signals or uplink random access signals (or referred to as uplink synchronization signals).

In this step, the candidate transmission configuration information set may be determined in the manners described below.

In the first manner, the candidate transmission configuration information set is configured by the base station by using a high-layer signaling. Here the high-layer signaling may be a protocol-layer signaling above the physical layer, such as a MAC-layer signaling and a Radio Resource Control (RRC)-layer signaling.

In the second manner, the candidate transmission configuration information set is fed back by a terminal. In an implementation, the base station may send a signaling to the terminal to instruct the terminal to determine transmission configuration information; after receiving the signaling, the terminal sends the base station a transmission configuration information set determined by the terminal.

In the third manner, the candidate transmission configuration information set is determined by information fed back by the terminal. In an implementation, when receiving the feedback information of the terminal, the base station may determine the candidate transmission configuration information set according to the feedback information.

In the fourth manner, the candidate transmission configuration information set is determined by the base station according to an uplink pilot measurement result. In an implementation, the base station receives the uplink pilot measurement result sent by the terminal, and then determines the candidate transmission configuration information set according to the uplink pilot measurement result.

In step 402, at least one type of transmission configuration information is selected from the determined candidate transmission configuration information set.

By way of example, the at least one type of transmission configuration information may be selected from the determined candidate transmission configuration information set according to transmission configuration selection indication information. In practical use, the transmission configuration selection indication information may be configured by the base station by using a physical-layer signaling.

In one embodiment, at least one of uplink channels, uplink signals, downlink channels or downlink signals may be grouped; then transmission configuration information is selected, for each group of channels or signals, from the determined candidate transmission configuration information set. Correspondingly, transmitting the selected transmission configuration information to the terminal by using the signaling includes: transmitting the transmission configuration information corresponding to the each group of channels or signals to the terminal by using a separate signaling.

Several grouping manners are described below by way of example.

Grouping manner 1: A group composed of uplink control channels and downlink control channels, a group composed of downlink measurement pilot signals and uplink measurement pilot signals, and a group composed of uplink data and downlink data are formed.

Grouping manner 2: A group composed of downlink control channels, a group composed of downlink data channels, a group composed of downlink pilot signals, a group composed of uplink control channels, a group composed of uplink data channels, and a group composed of uplink pilot signals are formed.

Further, when multiple different sets of downlink pilot signals exist, the multiple different sets of downlink pilot signals may be grouped into the same group or different groups.

Further, when multiple different sets of uplink pilot signals exist, the multiple different sets of uplink pilot signals may be grouped into the same group or different groups.

Further, when multiple different sets of downlink control channels exist, the multiple different sets of downlink control channels may be grouped into the same group or different groups.

Further, when multiple different sets of uplink control channels exist, the multiple different sets of uplink control channels may be grouped into the same group or different groups.

The grouping manner may be pre-agreed by the base station and the terminal, or may be determined by the base station and then notified by the base station to the terminal. The base station may pre-configure the grouping manner for the terminal by using a high-layer signaling.

In an implementation, after grouping, different transmission configuration information may be selected, for different groups, from the candidate transmission configuration information set. Therefore, for different groups, the base station may send different signalings to the terminal to instruct the terminal to select the corresponding transmission configuration information. In this case, different signals from the base station to the terminal may be separate.

In another embodiment, this step may be implemented in the manners described below.

Manner 1

Transmission configuration information is selected, for an uplink channel and a downlink channel separately, from the determined candidate transmission configuration information set; and correspondingly, transmitting the selected transmission configuration information to the terminal by using the signaling includes: transmitting the transmission configuration information corresponding to the uplink channel and the downlink channel separately to the terminal by using separate signalings.

Manner 2

Transmission configuration information is selected, for an uplink signal and a downlink signal separately, from the determined candidate transmission configuration information set; and correspondingly, transmitting the selected transmission configuration information to the terminal by using the signaling includes: transmitting the transmission configuration information corresponding to the uplink signal and the downlink signal separately to the terminal by using separate signalings.

Manner 3

Transmission configuration information is selected, for a pilot signal and a control channel separately, from the determined candidate transmission configuration information set; and correspondingly, transmitting the selected transmission configuration information to the terminal by using the signaling includes: transmitting the transmission configuration information corresponding to the pilot signal and the control channel separately to the terminal by using separate signalings.

Manner 4

Transmission configuration information is selected, for the pilot signal and a data channel separately, from the determined candidate transmission configuration information set; and correspondingly, transmitting the selected transmission configuration information to the terminal by using the signaling includes: transmitting the transmission configuration information corresponding to the pilot signal and the data channel separately to the terminal by using separate signalings.

Manner 5

Transmission configuration information is selected, for multiple types of pilot signals or multiple sets of pilot signals separately, from the determined candidate transmission configuration information set; and correspondingly, transmitting the selected transmission configuration information to the terminal by using the signaling includes: transmitting the transmission configuration information corresponding to the types of pilot signals or the sets of pilot signals separately to the terminal by using separate signalings.

Manner 6

Transmission configuration information is selected, for multiple control regions of time-frequency-code resources separately, from the determined candidate transmission configuration information set; and correspondingly, transmitting the selected transmission configuration information to the terminal by using the signaling includes: transmitting the transmission configuration information corresponding to the control regions of the time-frequency-code resources separately to the terminal by using separate signalings.

Manner 7

Transmission configuration information is selected, for multiple pieces of control information or a plurality of data information code blocks separately, from the determined candidate transmission configuration information set; and correspondingly, transmitting the selected transmission configuration information to the terminal by using the signaling includes: transmitting the transmission configuration information corresponding to the pieces of control information or the data information code blocks separately to the terminal by using separate signalings.

Manner 8

Transmission configuration information is selected, for multiple transport layers separately, from the determined candidate transmission configuration information set; and correspondingly, transmitting the selected transmission configuration information to the terminal by using the signaling includes: transmitting the transmission configuration information corresponding to the transport layers separately to the terminal by using separate signalings.

Further, after the at least one type of transmission configuration information is selected from the determined candidate transmission configuration information set, a channel and/or a signal may be received or sent according to the selected transmission configuration information.

In step 403, the selected transmission configuration information is transmitted to the terminal by using a signaling.

On the basis of the first embodiment of the present disclosure, different transmission configuration information may be configured for a pilot signal and other channels (for example, a data channel or a control channel). For example, different beam transmission information is configured, so that the pilot signal can be flexibly transmitted.

Additionally, on the basis of the first embodiment of the present disclosure, different transmission configuration information may be configured for multiple control channels, multiple control blocks, multiple pieces of control information or multiple data information code blocks. For example, different beam transmission information is configured, so that the control information can be flexibly transmitted, and different robustness or transmission directions are present when different control information is transmitted.

The first embodiment of the present disclosure will be further described below by way of one example.

The candidate transmission configuration information set determined by the base station includes K types of transmission configuration information. For example, the candidate transmission configuration information set includes K types of transmission configuration information, and each type of transmission configuration information corresponds to an uplink/downlink transmit/receive beam acquired on the basis of a previous set of pilot signals or synchronization signals. The following describes an example in which K is equal to 2.

Uplink/downlink beam transmission is achieved by joint indication. In embodiments of the present disclosure, a transmission beam may be indicated for an uplink channel or signal and a downlink channel or signal separately.

Figure 5:
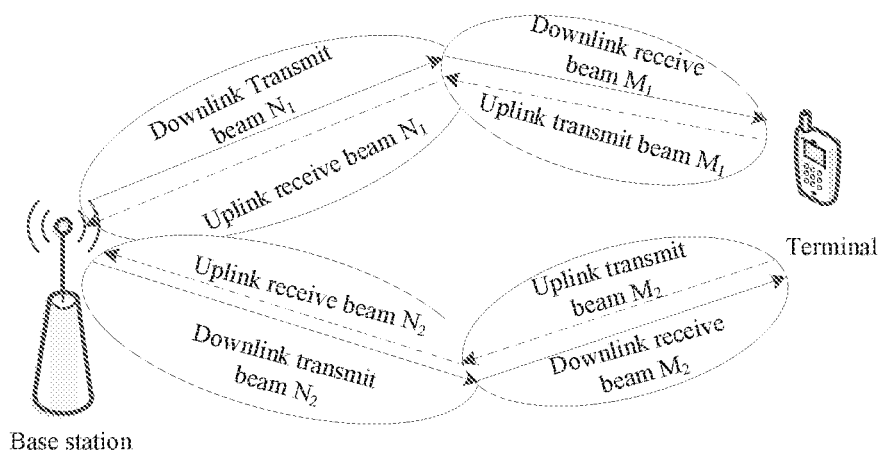
FIG. 5 is a schematic diagram illustrating beam transmission based on transmission configuration information according to a first embodiment of the present disclosure.

FIG. 5 is a schematic diagram illustrating beam transmission based on transmission configuration information according to the first embodiment of the present disclosure. As shown in FIG. 5, in downlink transmission, the beam dl_tx beam N1 is used to transmit and the beam dl_rx beam M1 is used to receive; in uplink transmission, the beam ul_tx beam M2 is used to transmit and the beam ul_rx beam N2 is used to receive. Such beam transmission indication manner makes uplink transmission and downlink transmission performed in different paths, thereby saving the transmission power of the terminal and achieving uplink load balancing. That is to say, the base station can perform more flexible beam configuration, thereby better meeting the transmission requirements and improving the transmission performance of the communication system.

Here separate transmission configuration information is used in the uplink and in the downlink and thus is notified to the terminal by using separate signalings. For example, a 1-bit signaling is used to notify the downlink transmission configuration information, and another 1-bit signaling is used to notify the uplink transmission configuration information.

K may be greater than 2. When more paths exist in a channel, more paths can be used for transmission. In this case, the number of bits of the corresponding notification signaling will also increase, and is $\log_2(K)$ for each of the uplink and in the downlink.

Second Embodiment

A second embodiment of the present disclosure provides another transmission configuration method. The method is applicable to network-side equipment such as a base station.

Figure 6:
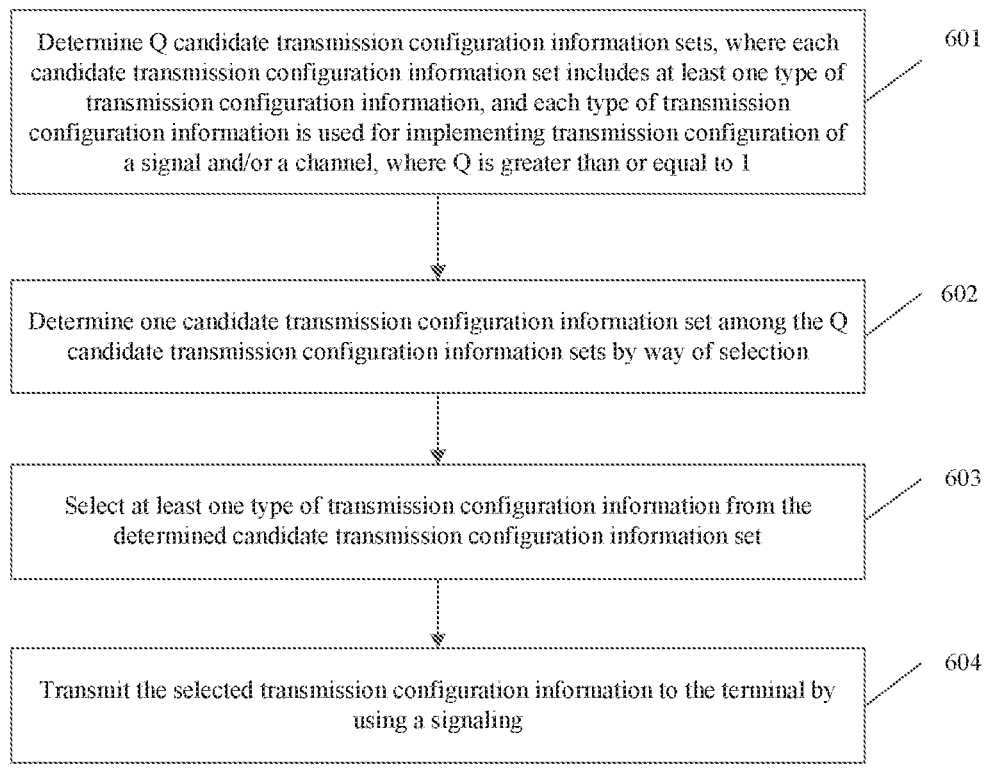
FIG. 6 is a flowchart of another embodiment of a transmission configuration method according to embodiments of the present disclosure.

FIG. 6 is a flowchart of another embodiment of a transmission configuration method according to embodiments of the present disclosure. As shown in FIG. 6, the method includes the steps described below.

In step 601, Q candidate transmission configuration information sets are determined, where each candidate transmission configuration information set includes at least one type of transmission configuration information, and each type of transmission configuration information is used for implementing transmission configuration of a signal and/or a channel, where Q is greater than or equal to 1.

In an implementation, this step may include: determining, according to the channel type and/or the signal type, Q candidate transmission configuration information sets, where each type of channel or each type of signal corresponds to at least one candidate transmission configuration information set. For example, the above-mentioned Q candidate transmission configuration information sets are described in Table 2.

TABLE 2

| Channel/signal type | Q candidate transmission configuration information sets |
| --- | --- |
| Downlink control channel | Candidate transmission configuration information set 1 |
| Downlink data channel | Candidate transmission configuration information set 1, candidate transmission configuration information set 2 |
| Downlink measurement pilot signal | Candidate transmission configuration information set 1, candidate transmission configuration information set 2, candidate transmission configuration information set 3 |

In an implementation, the Q candidate transmission configuration information sets may include: different candidate transmission configuration information sets corresponding to a control channel and a data channel separately.

Alternatively, the Q candidate transmission configuration information sets may include: different candidate transmission configuration information sets corresponding to the data channel and a measurement pilot signal separately.

Alternatively, the Q candidate transmission configuration information sets may include: different candidate transmission configuration information sets corresponding to the control channel and the measurement pilot signal separately.

Alternatively, the Q candidate transmission configuration information sets may include: Q1 candidate transmission configuration information sets corresponding to a first type of signal, and Q2 candidate transmission configuration information sets corresponding to a second type of signal, where Q1 is not equal to Q2.

Alternatively, the Q candidate transmission configuration information sets may include: Q3 candidate transmission configuration information sets corresponding to a first type of channel, and Q4 candidate transmission configuration information sets corresponding to a second type of channel, where Q3 is not equal to Q4.

Alternatively, the Q candidate transmission configuration information sets may include: Q5 candidate transmission configuration information sets corresponding to a third type of signal, and Q6 candidate transmission configuration information sets corresponding to a third type of channel, where Q5 is not equal to Q6.

To achieve a simpler transmission configuration process, the same Q candidate transmission configuration information sets may be configured for each type of channel or each type of signal, and then, a candidate transmission configuration information set may be further selected for each type of channel or each type of signal by using a subsequent signaling.

In an implementation, when Q is greater than 1, the Q candidate transmission configuration information sets include: different candidate transmission configuration information sets corresponding to two different reference signals separately.

In an implementation, when Q is greater than 1, the Q candidate transmission configuration information sets include: different candidate transmission configuration information sets corresponding to at least two different types of signals separately. Here the two different reference signals may be different types of reference signals, or may be different sets of reference signals of the same type. For example, exemplary Q candidate transmission configuration information sets are shown in Table 3.

TABLE 3

| Q candidate transmission configuration information sets | |
| --- | --- |
| Candidate transmission configuration information set 1 | Pilot type A, first set of pilots |
| Candidate transmission configuration information set 2 | Pilot type B, first set of pilots |
| Candidate transmission configuration information set 3 | Pilot type B, second set of pilots |
| Candidate transmission configuration information set 4 | Pilot type C, second set of pilots |

That is to say, the candidate transmission configuration information set may be in transmission association with different types of pilot signals or may be bound to different sets of pilot signals of the same type of pilot. Here the different sets of pilot signals correspond to their respective transmission configuration information.

For example, one candidate transmission configuration information set is in transmission association with two Channel State Information-Reference Signal (CSI-RS) set having different configurations, or in transmission association with one CSI-RS set and one Sounding Reference Signal (SRS) set, or in transmission association with one synchronization signal set and one CSI-RS or SRS set, or in transmission association with one Beam Reference Signal (BRS) set and one CSI-RS set, or in transmission association with one BRS set and one SRS set, or in transmission association with one BRS set and one Demodulation Reference Signal (DMRS) set. Here the synchronization signals may be downlink synchronization signals or uplink random access signals (or referred to as uplink synchronization signals).

Further, when Q is greater than 1, the Q candidate transmission configuration information sets include: a candidate transmission configuration information set in transmission association with an uplink reference signal and a candidate transmission configuration information set in transmission association with a downlink reference signal; or include candidate transmission configuration information sets in transmission association with multiple types of pilot signals or multiple sets of pilot signals separately; or include a candidate transmission configuration information set in transmission association with a synchronization signal and a candidate transmission configuration information set in transmission association with a pilot signal.

Here the reference signal may be a pilot signal or a synchronization signal, the pilot signal may be a measurement pilot signal or a demodulation pilot signal, and the synchronization signal may be a random access signal.

In step 602, one candidate transmission configuration information set is determined among the Q candidate transmission configuration information sets by way of selection.

When Q is equal to 1, a unique candidate transmission configuration information set is selected.

When Q is greater than 1, the transmission configuration information set may be further flexibly selected.

Further, when Q is greater than 1 and after the one candidate transmission configuration information set is determined among the Q candidate transmission configuration information sets by way of selection, the method further includes: notifying the terminal of the determined candidate transmission configuration information set. Here the determined candidate transmission configuration information set may be notified to the terminal by using a signaling, where generally, the size of the signaling may be $\log_2(Q)$ bits. Alternatively, the signaling and other indication information may be jointly coded, and then indication information generated after the joint coding is sent to the terminal.

Further, after one candidate transmission configuration information set is selected from the Q candidate transmission configuration information sets, a channel and/or a signal is received or sent according to the selected transmission configuration information.

In step 603, at least one type of transmission configuration information is selected from the determined candidate transmission configuration information set.

In an implementation, at least one type of transmission configuration information may be selected from the determined candidate transmission configuration information set according to the quality feedback information of the terminal or the measurement information of an uplink signal.

In step 604, the selected transmission configuration information is transmitted to the terminal by using a signaling.

After this step, the transmission configuration process of the second embodiment of the present disclosure is completed. It can be seen that when Q is equal to 1, only the selected transmission configuration information needs to be sent to the terminal by using a signaling; when Q is greater than 1, both the selected candidate transmission configuration information set and the selected transmission configuration information need to be sent to the terminal by using a signaling.

On the basis of the second embodiment of the present disclosure, corresponding candidate transmission configuration information sets may also be configured for different types of reference signals. For example, corresponding beam transmission information may be configured for different types of reference signals; and corresponding transmission configuration information sets may be configured for different channels or signals. The candidate transmission configuration information set includes transmission configuration information, and the transmission configuration information is used for configuration of transmission information such as beam transmission information. Therefore, as regards the characteristics of different signals, different transmission configuration information can be used. In this way, transmission configuration information can be flexibly configured. For example, wide-beam transmission is used for a control channel and narrow-beam transmission is used for a data channel.

Third Embodiment

Figure 7:
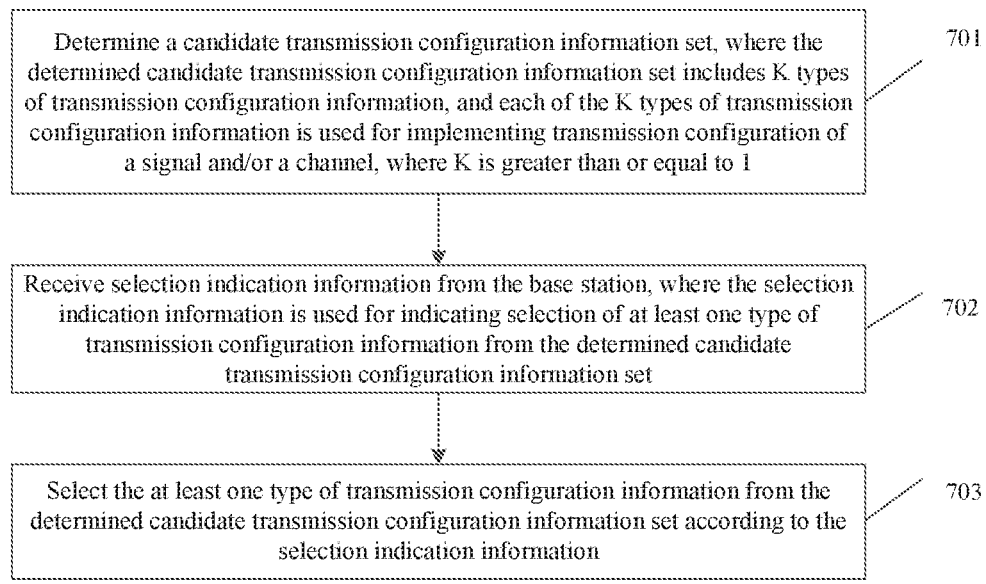
FIG. 7 is a flowchart of one embodiment of a transmission configuration determination method according to embodiments of the present disclosure.

A third embodiment of the present disclosure provides a transmission configuration determination method. The method is applicable to equipment such as a terminal. FIG. 7 is a flowchart of one embodiment of a transmission configuration determination method according to embodiments of the present disclosure. As shown in FIG. 7, the method includes the steps described below.

In step 701, a candidate transmission configuration information set is determined, where the determined candidate transmission configuration information set includes K types of transmission configuration information, and each of the K types of transmission configuration information is used for implementing transmission configuration of a signal and/or a channel, where K is greater than or equal to 1.

In an implementation, each piece of transmission configuration information in the determined candidate transmission configuration information set can be used for configuration of at least one of an uplink channel, an uplink signal, a downlink channel and a downlink signal. Here the types of the uplink channel, the uplink signal, the downlink channel and the downlink channel are not limited.

In an implementation, the determined candidate transmission configuration information set includes transmission configuration information corresponding to at least two types of signals. That is, the determined candidate transmission configuration information set includes transmission configuration information in transmission association with at least two types of signals.

In this step, the candidate transmission configuration information set may be configured by a high-layer signaling sent by a base station. Here the high-layer signaling may be a protocol-layer signaling above the physical layer, such as a MAC-layer signaling and a Radio Resource Control (RRC)-layer signaling.

In step 702, selection indication information from the base station is selected, where the selection indication information is used for indicating selection of at least one type of transmission configuration information from the determined candidate transmission configuration information set.

By way of example, the selection indication information is carried in a physical-layer signaling of the base station.

In an embodiment, before the at least one type of transmission configuration information is selected from the determined candidate transmission configuration information set, the method further includes: grouping at least one of an uplink channel, an uplink signal, a downlink channel or a downlink signal; correspondingly, the selection indication information includes: a control signaling corresponding to each group of channels or signals, where the control signaling corresponding to the each group of channels or signals is used for selecting transmission configuration information corresponding to the each group of channels or signals from the determined candidate transmission configuration information set; and selecting the at least one type of transmission configuration information from the determined candidate transmission configuration information set according to the selection indication information includes: selecting the transmission configuration information corresponding to the each group of channel or signals from the determined candidate transmission configuration information set according to the control signaling corresponding to the each group of channels or signals.

In an implementation, grouping the at least one of the uplink channel, the uplink signal, the downlink channel or the downlink signal includes: receiving a channel or signal grouping manner sent by the base station; and grouping the at least one of the uplink channel, the uplink signal, the downlink channel or the downlink signal according to the received channel or signal grouping manner.

In an implementation, the each group of channels or signals obtained from the grouping include at least one group of channels including an uplink control channel and a downlink control channel; or the each group of channels or signals obtained from the grouping include at least one group of signals including an uplink measurement pilot signal and a downlink measurement pilot signal.

In another embodiment, this step may be implemented in the manners described below.

Manner 1

The selection indication information includes: a control signaling corresponding to an uplink channel and a control signaling corresponding to a downlink channel, where the control signaling corresponding to the uplink channel is used for selecting transmission configuration information corresponding to the uplink channel from the determined candidate transmission configuration information set and the control signaling corresponding to the downlink channel is used for selecting transmission configuration information corresponding to the downlink channel from the determined candidate transmission configuration information set; and correspondingly, selecting the at least one type of transmission configuration information from the determined candidate transmission configuration information set according to the selection indication information includes: selecting the transmission configuration information corresponding to the uplink channel and the transmission configuration information corresponding to the downlink channel separately from the determined candidate transmission configuration information set according to the selection indication information.

Manner 2

The selection indication information includes: a control signaling corresponding to an uplink signal and a control signaling corresponding to a downlink signal, where the control signaling corresponding to the uplink signal is used for selecting transmission configuration information corresponding to the uplink signal from the determined candidate transmission configuration information set and the control signaling corresponding to the downlink signal is used for selecting transmission configuration information corresponding to the downlink signal from the determined candidate transmission configuration information set; and correspondingly, selecting the at least one type of transmission configuration information from the determined candidate transmission configuration information set according to the selection indication information includes: selecting the transmission configuration information corresponding to the uplink signal and the transmission configuration information corresponding to the downlink signal separately from the determined candidate transmission configuration information set according to the selection indication information.

Manner 3

The selection indication information includes: a control signaling corresponding to a pilot signal and a control signaling corresponding to a control channel, where the control signaling corresponding to the pilot signal is used for selecting transmission configuration information corresponding to the pilot signal from the determined candidate transmission configuration information set and the control signaling corresponding to the control channel is used for selecting transmission configuration information corresponding to the control channel from the determined candidate transmission configuration information set; and correspondingly, selecting the at least one type of transmission configuration information from the determined candidate transmission configuration information set according to the selection indication information includes: selecting the transmission configuration information corresponding to the pilot signal and the transmission configuration information corresponding to the control channel separately from the determined candidate transmission configuration information set according to the selection indication information.

Manner 4

The selection indication information includes: a control signaling corresponding to the pilot signal and a control signaling corresponding to a data channel, where the control signaling corresponding to the pilot signal is used for selecting transmission configuration information corresponding to the pilot signal from the determined candidate transmission configuration information set and the control signaling corresponding to the data channel is used for selecting transmission configuration information corresponding to the data channel from the determined candidate transmission configuration information set; and correspondingly, selecting the at least one type of transmission configuration information from the determined candidate transmission configuration information set according to the selection indication information includes: selecting the transmission configuration information corresponding to the pilot signal and the transmission configuration information corresponding to the data channel separately from the determined candidate transmission configuration information set according to the selection indication information.

Manner 5

The selection indication information includes: control signalings corresponding to a plurality of types of pilot signals or a plurality of sets of pilot signals, where a control signaling corresponding to each type of the types of pilot signals or each set of the sets of pilot signals is used for selecting transmission configuration information corresponding to the each type of the types of pilot signals or the each set of the sets of pilot signals from the determined candidate transmission configuration information set; and correspondingly, selecting the at least one type of transmission configuration information from the determined candidate transmission configuration information set according to the selection indication information includes: selecting transmission configuration information corresponding to the each type of the types of pilot signals or the each set of the sets of pilot signals from the determined candidate transmission configuration information set according to the selection indication information.

Manner 6

The selection indication information includes: control signalings corresponding to a plurality of control regions of time-frequency-code resources, where a control signaling corresponding to each of the control regions of the time-frequency-code resources is used for selecting transmission configuration information corresponding to the each of the control regions of the time-frequency-code resources from the determined candidate transmission configuration information set; and correspondingly, selecting the at least one type of transmission configuration information from the determined candidate transmission configuration information set according to the selection indication information includes: selecting transmission configuration information corresponding to the control regions of the time-frequency-code resources from the determined candidate transmission configuration information set according to the selection indication information.

Manner 7

The selection indication information includes: control signalings corresponding to multiple pieces of control information or multiple data information code blocks, where a control signaling corresponding to each of the multiple pieces of control information is used for selecting corresponding transmission configuration information from the determined candidate transmission configuration information set and a control signaling corresponding to each of the multiple data information code blocks is used for selecting corresponding transmission configuration information from the determined candidate transmission configuration information set; and correspondingly, the selecting the one or more types of transmission configuration information from the determined candidate transmission configuration information set according to the selection indication information includes: selecting transmission configuration information corresponding to the each of the multiple pieces of control information or the each of the multiple data information code blocks from the determined candidate transmission configuration information set according to the selection indication information.

Manner 8

The selection indication information includes: control signalings corresponding to a plurality of transport layers, where a control signaling corresponding to each of the transport layers is used for selecting transmission configuration information corresponding to the each of the transport layers from the determined candidate transmission configuration information set; and correspondingly, selecting the at least one type of transmission configuration information from the determined candidate transmission configuration information set according to the selection indication information includes: selecting transmission configuration information corresponding to the each of the transport layers from the determined candidate transmission configuration information set according to the selection indication information.

In step 703, the at least one type of transmission configuration information is selected from the determined candidate transmission configuration information set according to the selection indication information.

Further, after the at least one type of transmission configuration information is selected from the determined candidate transmission configuration information set, a channel and/or a signal may be received or sent according to the selected transmission configuration information.

Fourth Embodiment

Figure 8:
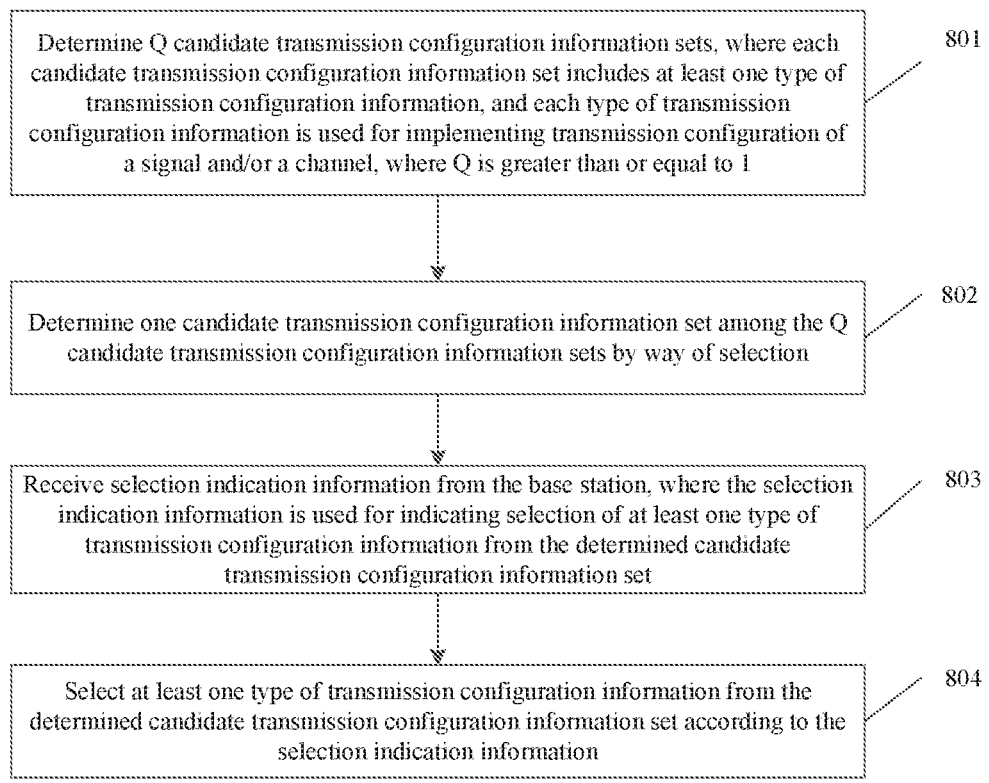
FIG. 8 is a flowchart of another embodiment of a transmission configuration determination method according to embodiments of the present disclosure.

A fourth embodiment of the present disclosure provides another transmission configuration determination method. The method is applicable to equipment such as a terminal. FIG. 8 is a flowchart of another embodiment of a transmission configuration determination method according to embodiments of the present disclosure. As shown in FIG. 8, the method includes the steps described below.

In step 801, Q candidate transmission configuration information sets are determined, where each candidate transmission configuration information set includes at least one type of transmission configuration information, and each type of transmission configuration information is used for implementing transmission configuration of a signal and/or a channel, where Q is greater than or equal to 1.

By way of example, determining the Q candidate transmission configuration information sets includes: determining the Q candidate transmission configuration information sets according to a channel type and/or a signal type, where each type of channel or each type of signal corresponds to at least one of the candidate transmission configuration information sets.

In an implementation, the Q candidate transmission configuration information sets include: different candidate transmission configuration information sets corresponding to a control channel and a data channel separately; or the Q candidate transmission configuration information sets include: different candidate transmission configuration information sets corresponding to the data channel and a measurement pilot signal separately; or the Q candidate transmission configuration information sets include: different candidate transmission configuration information sets corresponding to the control channel and the measurement pilot signal separately; or the Q candidate transmission configuration information sets include: Q1 candidate transmission configuration information sets corresponding to a first type of signal, and Q2 candidate transmission configuration information sets corresponding to a second type of signal, where Q1 is not equal to Q2; or the Q candidate transmission configuration information sets include: Q3 candidate transmission configuration information sets corresponding to a first type of channel, and Q4 candidate transmission configuration information sets corresponding to a second type of channel, where Q3 is not equal to Q4; or the Q candidate transmission configuration information sets include: Q5 candidate transmission configuration information sets corresponding to a third type of signal, and Q6 candidate transmission configuration information sets corresponding to a third type of channel, where Q5 is not equal to Q6.

By way of example, when Q is greater than 1, the Q candidate transmission configuration information sets include: candidate transmission configuration information sets corresponding to two different reference signals separately or different candidate transmission configuration information sets corresponding to at least two different types of signals separately. Here, the reference signal may be a pilot signal or a synchronization signal.

Further, when Q is greater than 1, the Q candidate transmission configuration information sets include: a candidate transmission configuration information set corresponding to an uplink reference signal and a candidate transmission configuration information set corresponding to a downlink reference signal; or the Q candidate transmission configuration information sets comprise: candidate transmission configuration information sets corresponding to a plurality of types of pilot signals or a plurality of sets of pilot signals separately; or the Q candidate transmission configuration information sets comprise: a candidate transmission configuration information set corresponding to a synchronization signal and a candidate transmission configuration information set corresponding to a pilot signal.

In step 802, one candidate transmission configuration information set is determined among the Q candidate transmission configuration information sets by way of selection.

In an implementation, an indication signaling sent by the base station may be received, where the indication signaling is used for indicating selection of the one candidate transmission configuration information set from the Q candidate transmission configuration information sets; and then the one candidate transmission configuration information set is selected from the Q candidate transmission configuration information sets according to the indication signaling.

In step 803, selection indication information from the base station is selected, where the selection indication information is used for indicating selection of at least one type of transmission configuration information from the determined candidate transmission configuration information set.

In step 804, the at least one type of transmission configuration information is selected from the determined candidate transmission configuration information set according to the selection indication information.

Further, after the at least one type of transmission configuration information is selected from the determined candidate transmission configuration information set, a channel and/or a signal may be received or sent according to the selected transmission configuration information.

Fifth Embodiment

Figure 9:
FIG. 9 is a structure diagram of a base station according to embodiments of the present disclosure.

As regards the transmission configuration methods in the first embodiment and the second embodiment of the present disclosure, a fifth embodiment of the present disclosure provides a base station. FIG. 9 is a structure diagram of a base station according to embodiments of the present disclosure. As shown in FIG. 9, the base station includes: a first processor 901 and a first signal transceiver 902.

The first processor 901 is configured to determine a candidate transmission configuration information set, where the determined candidate transmission configuration information set includes K types of transmission configuration information, and each of the K types of transmission configuration information is used for implementing transmission configuration of a signal and/or a channel, where K is greater than or equal to 1.

The first processor 901 is further configured to select at least one type of transmission configuration information from the determined candidate transmission configuration information set and to send the selected transmission configuration information to the first signal transceiver 902.

The first signal transceiver 902 is configured to transmit the selected transmission configuration information to a terminal by using a signaling.

Sixth Embodiment

Figure 10:
FIG. 10 is a structure diagram of a terminal according to embodiments of the present disclosure.

As regards the transmission configuration determination methods in the third embodiment and the fourth embodiment of the present disclosure, a sixth embodiment of the present disclosure provides a terminal. FIG. 10 is a structure diagram of a terminal according to embodiments of the present disclosure. As shown in FIG. 10, the terminal includes: a second processor 1001 and a second signal transceiver 1002.

The second processor 1001 is configured to determine a candidate transmission configuration information set, where the determined candidate transmission configuration information set includes K types of transmission configuration information, and each of the K types of transmission configuration information is used for implementing transmission configuration of a signal and/or a channel, where K is greater than or equal to 1.

The second signal transceiver 1002 is configured to receive selection indication information from a base station and to send the selection indication information to the second processor, where the selection indication information is used for indicating selection of at least one type of transmission configuration information from the determined candidate transmission configuration information set.

The second processor 1001 is further configured to select the at least one type of transmission configuration information from the determined candidate transmission configuration information set according to the selection indication information.

It is to be understood by those skilled in the art that embodiments of the present disclosure may be provided as methods, systems or computer program products. Therefore, the present application may take the form of a hardware embodiment, a software embodiment, or an embodiment combining software and hardware. The present application may take the form of a computer program product implemented in one or more computer-usable storage media (including, but not limited to, a disk memory and an optical memory) that includes computer-usable program codes.

The present application is described with reference to flowcharts and/or block diagrams of the method, apparatus (system) and computer program product according to embodiments of the present disclosure. It is to be understood that the computer program instructions can be used to implement each flow and/or block in the flowcharts and/or block diagrams and a combination of flows and/or blocks in the flowcharts and/or block diagrams. These computer program instructions can be provided to a processor of a general purpose computer, special purpose computer, embedded processor, or another programmable data processing device to produce a machine, so as to enable instructions executed by a processor of a computer or another programmable data processing device to generate an apparatus for implementing the functions specified in one or more flows in the flowcharts and/or one or more blocks in the block diagrams.

The computer program instructions can also be stored in a computer-readable memory that can direct a computer or another programmable data processing device to operate in a particular manner, so that the instructions stored in the computer-readable memory produce an article of manufacture including an instruction apparatus. The instruction apparatus implements the functions specified in one or more flows in the flowcharts and/or one or more blocks in the block diagrams.

These computer program instructions can also be loaded onto a computer or another programmable data processing device, so that a series of operating steps are performed on a computer or another programmable device, and the instructions executed on the computer or another programmable device provide steps for implementing the functions specified in one or more flows in the flowcharts and/or one or more blocks in the block diagrams.

The above-mentioned are only embodiments of the present disclosure and are not intended to limit the scope of the present application.

INDUSTRIAL APPLICABILITY

In the transmission configuration method, transmission configuration determination method, base station, terminal and computer storage medium provided in embodiments of the present disclosure, a candidate transmission configuration information set is determined, where the determined candidate transmission configuration information set includes K types of transmission configuration information, and each of the K types of transmission configuration information is used for implementing transmission configuration of at least one of a signal or a channel, where K is greater than or equal to 1; at least one type of transmission configuration information is selected from the determined candidate transmission configuration information set; and the selected transmission configuration information is transmitted to the terminal by using a signaling. In this way, the transmission configuration information can be configured flexibly, thereby better meeting the transmission requirements and improving the transmission performance of the communication system.

What is claimed is:

1. A transmission configuration method, comprising:
   determining a candidate transmission configuration information set, wherein the determined candidate transmission configuration information set comprises K types of transmission configuration information, and each of the K types of transmission configuration information is used for implementing at least one of transmission configuration of signal or transmission configuration of channel, wherein K is greater than or equal to 1;
   selecting at least one type of transmission configuration information from the determined candidate transmission configuration information set; and
   transmitting the selected transmission configuration information to a terminal by using a signaling,
   wherein selecting the at least one type of transmission configuration information from the determined candidate transmission configuration information set comprises:
      grouping at least one of an uplink channel, an uplink signal, a downlink channel or a downlink signal; and
      selecting, for each group of channels or signals, transmission configuration information from the determined candidate transmission configuration information set;
   correspondingly, transmitting the selected transmission configuration information to the terminal by using the signaling comprises:
      transmitting the transmission configuration information corresponding to the each group of channels or signals to the terminal by using a separate signaling,
   wherein determining the candidate transmission configuration information set comprises:
      determining Q candidate transmission configuration information sets, wherein each of the Q candidate transmission configuration information sets comprises at least one type of transmission configuration information, wherein Q is greater than or equal to 1; and
      determining one candidate transmission configuration information set among the Q candidate transmission configuration information sets by way of selection,
   wherein when Q is greater than 1, the Q candidate transmission configuration information sets comprise: different candidate transmission configuration information sets corresponding to two different reference signals separately.

2. The method of claim 1, wherein selecting the at least one type of transmission configuration information from the determined candidate transmission configuration information set comprises: selecting, for an uplink channel and a downlink channel separately, transmission configuration information from the determined candidate transmission configuration information set; and correspondingly, transmitting the selected transmission configuration information to the terminal by using the signaling comprises: transmitting the transmission configuration information corresponding to the uplink channel and the downlink channel separately to the terminal by using separate signalings; or
   selecting the at least one type of transmission configuration information from the determined candidate transmission configuration information set comprises: selecting, for an uplink signal and a downlink signal separately, transmission configuration information from the determined candidate transmission configuration information set; and correspondingly, transmitting the selected transmission configuration information to the terminal by using the signaling comprises: transmitting the transmission configuration information corresponding to the uplink signal and the downlink signal separately to the terminal by using separate signalings; or
   selecting the at least one type of transmission configuration information from the determined candidate transmission configuration information set comprises: selecting, for a pilot signal and a control channel separately, transmission configuration information from the determined candidate transmission configuration information set; and correspondingly, transmitting the selected transmission configuration information to the terminal by using the signaling comprises: transmitting the transmission configuration information corresponding to the pilot signal and the control channel separately to the terminal by using separate signalings; or selecting the at least one type of transmission configuration information from the determined candidate transmission configuration information set comprises: selecting, for the pilot signal and a data channel separately, transmission configuration information from the determined candidate transmission configuration information set; and correspondingly, transmitting the selected transmission configuration information to the terminal by using the signaling comprises: transmitting the transmission configuration information corresponding to the pilot signal and the data channel separately to the terminal by using separate signalings; or selecting the at least one type of transmission configuration information from the determined candidate transmission configuration information set comprises: selecting, for a plurality of types of pilot signals or a plurality of sets of pilot signals separately, transmission configuration information from the determined candidate transmission configuration information set; and correspondingly, transmitting the selected transmission configuration information to the terminal by using the signaling comprises: transmitting the transmission configuration information corresponding to the types of pilot signals or the sets of pilot signals separately to the terminal by using separate signalings; or selecting the at least one type of transmission configuration information from the determined candidate transmission configuration information set comprises: selecting, for a plurality of control regions of time-frequency-code resources separately, transmission configuration information from the determined candidate transmission configuration information set; and correspondingly, transmitting the selected transmission configuration information to the terminal by using the signaling comprises: transmitting the transmission configuration information corresponding to the control regions of the time-frequency-code resources separately to the terminal by using separate signalings; or selecting the at least one type of transmission configuration information from the determined candidate transmission configuration information set comprises: selecting, for a plurality of pieces of control information or a plurality of data information code blocks separately, transmission configuration information from the determined candidate transmission configuration information set; and correspondingly, transmitting the selected transmission configuration information to the terminal by using the signaling comprises: transmitting the transmission configuration information corresponding to the pieces of control information or the data information code blocks separately to the terminal by using separate signalings; or selecting the at least one type of transmission configuration information from the determined candidate transmission configuration information set comprises: selecting, for a plurality of transport layers separately, transmission configuration information from the determined candidate transmission configuration information set; and correspondingly, transmitting the selected transmission configuration information to the terminal by using the signaling comprises: transmitting the transmission configuration information corresponding to the transport layers separately to the terminal by using separate signalings.

3. The method of claim 1, wherein determining the Q candidate transmission configuration information sets comprises:
   determining the Q candidate transmission configuration information sets according to at least one of a channel type or a signal type,
wherein each type of channel or each type of signal corresponds to at least one of the candidate transmission configuration information sets.

4. The method of claim 3, wherein
   the Q candidate transmission configuration information sets comprise: different candidate transmission configuration information sets corresponding to a control channel and a data channel separately; or
   the Q candidate transmission configuration information sets comprise: different candidate transmission configuration information sets corresponding to the data channel and a measurement pilot signal separately; or
   the Q candidate transmission configuration information sets comprise: different candidate transmission configuration information sets corresponding to the control channel and the measurement pilot signal separately; or
   the Q candidate transmission configuration information sets comprise: Q1 candidate transmission configuration information sets corresponding to a first type of signal, and Q2 candidate transmission configuration information sets corresponding to a second type of signal, wherein Q1 is not equal to Q2; or
   the Q candidate transmission configuration information sets comprise: Q3 candidate transmission configuration information sets corresponding to a first type of channel, and Q4 candidate transmission configuration information sets corresponding to a second type of channel, wherein Q3 is not equal to Q4; or
   the Q candidate transmission configuration information sets comprise: Q5 candidate transmission configuration information sets corresponding to a third type of signal, and Q6 candidate transmission configuration information sets corresponding to a third type of channel, wherein Q5 is not equal to Q6.

5. The method of claim 1,
   wherein the Q candidate transmission configuration information sets comprise: a candidate transmission configuration information set corresponding to an uplink reference signal and a candidate transmission configuration information set corresponding to a downlink reference signal; or
   the Q candidate transmission configuration information sets comprise: candidate transmission configuration information sets corresponding to a plurality of types of pilot signals or a plurality of sets of pilot signals separately; or
   the Q candidate transmission configuration information sets comprise: a candidate transmission configuration information set corresponding to a synchronization signal and a candidate transmission configuration information set corresponding to a pilot signal.

6. The method of claim 1, wherein when Q is greater than 1 and after determining the one candidate transmission configuration information set among the Q candidate transmission configuration information sets by way of selection, the method further comprises:

notifying the terminal of the determined candidate transmission configuration information set.

7. A transmission configuration determination method, comprising:

determining a candidate transmission configuration information set, wherein the determined candidate transmission configuration information set comprises K types of transmission configuration information, and each of the K types of transmission configuration information is used for implementing transmission configuration of signal or transmission of channel, wherein K is greater than or equal to 1;

receiving selection indication information from a base station, wherein the selection indication information is used for indicating selection of at least one type of transmission configuration information from the determined candidate transmission configuration information set; and selecting the at least one type of transmission configuration information from the determined candidate transmission configuration information set according to the selection indication information, wherein before selecting the at least one type of transmission configuration information from the determined candidate transmission configuration information set, the method further comprises:

grouping at least one of an uplink channel, an uplink signal, a downlink channel or a downlink signal;

correspondingly, the selection indication information comprises: a control signaling corresponding to each group of channels or signals, wherein the control signaling corresponding to the each group of channels or signals is used for selecting transmission configuration information corresponding to the each group of channels or signals from the determined candidate transmission configuration information set; and selecting the at least one type of transmission configuration information from the determined candidate transmission configuration information set according to the selection indication information comprises:

selecting the transmission configuration information corresponding to the each group of channel or signals from the determined candidate transmission configuration information set according to the control signaling corresponding to the each group of channels or signals, wherein determining the candidate transmission configuration information set comprises:

determining Q candidate transmission configuration information sets, wherein each of the Q candidate transmission configuration information sets comprises at least one type of transmission configuration information, wherein Q is greater than or equal to 1; and determining one candidate transmission configuration information set among the Q candidate transmission configuration information sets by way of selection, wherein when Q is greater than 1, the Q candidate transmission configuration information sets comprise: different candidate transmission configuration information sets corresponding to two different reference signals separately.

8. The method of claim 7, wherein the selection indication information comprises: a control signaling corresponding to an uplink channel and a control signaling corresponding to a downlink channel, wherein the control signaling corresponding to the uplink channel is used for selecting transmission configuration information corresponding to the uplink channel from the determined candidate transmission configuration information set and the control signaling corresponding to the downlink channel is used for selecting transmission configuration information corresponding to the downlink channel from the determined candidate transmission configuration information set; and correspondingly, selecting the at least one type of transmission configuration information from the determined candidate transmission configuration information set according to the selection indication information comprises: selecting the transmission configuration information corresponding to the uplink channel and the transmission configuration information corresponding to the downlink channel separately from the determined candidate transmission configuration information set according to the selection indication information; or the selection indication information comprises: a control signaling corresponding to an uplink signal and a control signaling corresponding to a downlink signal, wherein the control signaling corresponding to the uplink signal is used for selecting transmission configuration information corresponding to the uplink signal from the determined candidate transmission configuration information set and the control signaling corresponding to the downlink signal is used for selecting transmission configuration information corresponding to the downlink signal from the determined candidate transmission configuration information set; and correspondingly, selecting the at least one type of transmission configuration information from the determined candidate transmission configuration information set according to the selection indication information comprises: selecting the transmission configuration information corresponding to the uplink signal and the transmission configuration information corresponding to the downlink signal separately from the determined candidate transmission configuration information set according to the selection indication information; or the selection indication information comprises: a control signaling corresponding to a pilot signal and a control signaling corresponding to a control channel, wherein the control signaling corresponding to the pilot signal is used for selecting transmission configuration information corresponding to the pilot signal from the determined candidate transmission configuration information set and the control signaling corresponding to the control channel is used for selecting transmission configuration information corresponding to the control channel from the determined candidate transmission configuration information set; and correspondingly, selecting the at least one type of transmission configuration information from the determined candidate transmission configuration information set according to the selection indication information comprises: selecting the transmission configuration information corresponding to the pilot signal and the transmission configuration information corresponding to the control channel separately from the determined candidate transmission configuration information set according to the selection indication information; or the selection indication information comprises: a control signaling corresponding to the pilot signal and a control signaling corresponding to a data channel, wherein the control signaling corresponding to the pilot signal is used for selecting transmission configuration information corresponding to the pilot signal from the determined candidate transmission configuration information set and the control signaling corresponding to the data channel is used for selecting transmission configuration information corresponding to the data channel from the determined candidate transmission configuration information set; and correspondingly, selecting the at least one type of transmission configuration information from the determined candidate transmission configuration information set according to the selection indication information comprises: selecting the transmission configuration information corresponding to the pilot signal and the transmission configuration information corresponding to the data channel separately from the determined candidate transmission configuration information set according to the selection indication information; or the selection indication information comprises: control signalings corresponding to a plurality of types of pilot signals or a plurality of sets of pilot signals, wherein a control signaling corresponding to each type of the types of pilot signals or each set of the sets of pilot signals is used for selecting transmission configuration information corresponding to the each type of the types of pilot signals or the each set of the sets of pilot signals from the determined candidate transmission configuration information set; and correspondingly, selecting the at least one type of transmission configuration information from the determined candidate transmission configuration information set according to the selection indication information comprises: selecting transmission configuration information corresponding to the each type of the types of pilot signals or the each set of the sets of pilot signals from the determined candidate transmission configuration information set according to the selection indication information; or the selection indication information comprises: control signalings corresponding to a plurality of control regions of time-frequency-code resources, wherein a control signaling corresponding to each of the control regions of the time-frequency-code resources is used for selecting transmission configuration information corresponding to the each of the control regions of the time-frequency-code resources from the determined candidate transmission configuration information set; and correspondingly, selecting the at least one type of transmission configuration information from the determined candidate transmission configuration information set according to the selection indication information comprises: selecting transmission configuration information corresponding to the control regions of the time-frequency-code resources from the determined candidate transmission configuration information set according to the selection indication information; or the selection indication information comprises: control signalings corresponding to a plurality of pieces of control information or a plurality of data information code blocks, wherein a control signaling corresponding to each of the pieces of control information is used for selecting transmission configuration information corresponding to the each of the pieces of control information from the determined candidate transmission configuration information set and a control signaling corresponding to each of the data information code blocks is used for selecting transmission configuration information corresponding to the each of the data information code blocks from the determined candidate transmission configuration information set; and correspondingly, selecting the at least one type of transmission configuration information from the determined candidate transmission configuration information set according to the selection indication information comprises: selecting transmission configuration information corresponding to the each of the pieces of control information or the each of the data information code blocks from the determined candidate transmission configuration information set according to the selection indication information; or the selection indication information comprises: control signalings corresponding to a plurality of transport layers, wherein a control signaling corresponding to each of the transport layers is used for selecting transmission configuration information corresponding to the each of the transport layers from the determined candidate transmission configuration information set; and correspondingly, selecting the at least one type of transmission configuration information from the determined candidate transmission configuration information set according to the selection indication information comprises: selecting transmission configuration information corresponding to the each of the transport layers from the determined candidate transmission configuration information set according to the selection indication information.

9. The method of claim 7, wherein determining the Q candidate transmission configuration information sets comprises:
determining the Q candidate transmission configuration information sets according to at least one of a channel type or a signal type, wherein each type of channel or each type of signal corresponds to at least one of the candidate transmission configuration information sets.

10. The method of claim 9, wherein
the Q candidate transmission configuration information sets comprise: different candidate transmission configuration information sets corresponding to a control channel and a data channel separately; or
the Q candidate transmission configuration information sets comprise: different candidate transmission configuration information sets corresponding to the data channel and a measurement pilot signal separately; or
the Q candidate transmission configuration information sets comprise: different candidate transmission configuration information sets corresponding to the control channel and the measurement pilot signal separately; or
the Q candidate transmission configuration information sets comprise: Q1 candidate transmission configuration information sets corresponding to a first type of signal, and Q2 candidate transmission configuration information sets corresponding to a second type of signal, wherein Q1 is not equal to Q2; or
the Q candidate transmission configuration information sets comprise: Q3 candidate transmission configuration information sets corresponding to a first type of channel, and Q4 candidate transmission configuration information sets corresponding to a second type of channel, wherein Q3 is not equal to Q4; or
the Q candidate transmission configuration information sets comprise: Q5 candidate transmission configuration information sets corresponding to a third type of signal, and Q6 candidate transmission configuration information sets corresponding to a third type of channel, wherein Q5 is not equal to Q6.

11. The method of claim 7, wherein
wherein the Q candidate transmission configuration information sets comprise: a candidate transmission configuration information set corresponding to an uplink reference signal and a candidate transmission configuration information set corresponding to a downlink reference signal; or the Q candidate transmission configuration information sets comprise: candidate transmission configuration information sets corresponding to a plurality of types of pilot signals or a plurality of sets of pilot signals separately; or the Q candidate transmission configuration information sets comprise: a candidate transmission configuration information set corresponding to a synchronization signal and a candidate transmission configuration information set corresponding to a pilot signal.

12. The method of claim 7, wherein the method further comprises: receiving an indication signaling sent by the base station, wherein the indication signaling is used for indicating selection of the one candidate transmission configuration information set from the Q candidate transmission configuration information sets; and selecting the one candidate transmission configuration information set from the Q candidate transmission configuration information sets comprises: selecting the one candidate transmission configuration information set from the Q candidate transmission configuration information sets according to the indication signaling.

13. A base station, comprising a first processor and a first signal transceiver, wherein the first processor is configured to determine a candidate transmission configuration information set, wherein the determined candidate transmission configuration information set comprises K types of transmission configuration information, and each of the K types of transmission configuration information is used for implementing transmission configuration of at least one of a signal or a channel, wherein K is greater than or equal to 1;

the first processor is further configured to select at least one type of transmission configuration information from the determined candidate transmission configuration information set and to send the selected transmission configuration information to the first signal transceiver; and the first signal transceiver is configured to transmit the selected transmission configuration information to a terminal by using a signaling, wherein the first processor is further configured to select the at least one type of transmission configuration information from the determined candidate transmission configuration information set by a method comprising:

grouping at least one of an uplink channel, an uplink signal, a downlink channel or a downlink signal; and selecting, for each group of channels or signals, transmission configuration information from the determined candidate transmission configuration information set;

correspondingly, transmitting the selected transmission configuration information to the terminal by using the signaling comprises:

transmitting the transmission configuration information corresponding to the each group of channels or signals to the terminal by using a separate signaling, wherein the first processor is configured to determine the candidate transmission configuration information set comprises:

determining Q candidate transmission configuration information sets, wherein each of the Q candidate transmission configuration information sets comprises at least one type of transmission configuration information, wherein Q is greater than or equal to 1; and determining one candidate transmission configuration information set among the Q candidate transmission configuration information sets by way of selection, wherein when Q is greater than 1, the Q candidate transmission configuration information sets comprise: different candidate transmission configuration information sets corresponding to two different reference signals separately.

14. A terminal, comprising a second processor and a second signal transceiver, wherein the second processor is configured to implement the step of determining a candidate transmission configuration information set and the step of selecting the at least one type of transmission configuration information of the transmission configuration determination method of claim 7;

the second signal transceiver is configured to implement the step of receiving selection indication information from a base station of the transmission configuration determination method.

15. The terminal of claim 14, wherein the second processor is configured to determine Q candidate transmission configuration information sets and to determine one candidate transmission configuration information set among the Q candidate transmission configuration information sets by way of selection, wherein each of the Q candidate transmission configuration information sets comprises at least one type of transmission configuration information, wherein Q is greater than or equal to 1.

16. A non-transitory computer readable storage medium, which is configured to store program instructions, wherein the instructions, when executed by a processor, implement the transmission configuration method of claim 1.

17. A non-transitory computer readable storage medium, which is configured to store program instructions, wherein the instructions, when executed by a processor, implement the transmission configuration determination method of claim 7.

* * * * *

UNITED STATES PATENT AND TRADEMARK OFFICE
CERTIFICATE OF CORRECTION

| | | |
|---|---|---|
| PATENT NO. | : 11,265,735 B2 | Page 1 of 1 |
| APPLICATION NO. | : 16/347392 | |
| DATED | : March 1, 2022 | |
| INVENTOR(S) | : Chen et al. | |

It is certified that error appears in the above-identified patent and that said Letters Patent is hereby corrected as shown below:

In the Specification

Column 1, Line 50, delete "$n_{RF}^t$" and insert -- $n_{RF}^r$ --.

Column 2, Line 57, delete "txbeam" and insert -- tx beam --.

Column 2, Line 60, delete "rxbeam" and insert -- rx beam --.

In the Claims

Column 28, Line 64-65, Claim 11, delete "wherein wherein" and insert -- wherein --.

Signed and Sealed this
Fifth Day of July, 2022

Katherine Kelly Vidal
*Director of the United States Patent and Trademark Office*